United States Patent

[11] 3,620,251

| | | | |
|---|---|---|---|
| [72] | Inventor | John C. Bowen |
| | | Huntingdon Valley, Pa. |
| [21] | Appl. No. | 4,515 |
| [22] | Filed | Jan. 21, 1970 |
| [45] | Patented | Nov. 16, 1971 |
| [73] | Assignee | The Duriron Company, Inc. |
| | | Dayton, Ohio |

[54] VALVES
5 Claims, 3 Drawing Figs.

[52] U.S. Cl.................................................. 137/614.11, 251/333
[51] Int. Cl. ................................................. F16k 25/00
[50] Field of Search ................................. 137/614.11, 614; 251/333

[56] References Cited
UNITED STATES PATENTS

| 2,822,789 | 2/1958 | Philips.......................... | 251/333 |
| 3,051,196 | 8/1962 | Miller........................... | 251/333 |
| 3,168,282 | 2/1965 | Latshaw....................... | 251/333 |
| 3,168,766 | 2/1965 | Hornick....................... | 251/333 |
| 3,415,427 | 12/1968 | Sharp.......................... | 251/333 |

Primary Examiner—Herbert F. Ross
Assistant Examiner—William H. Wright
Attorney—Zachary T. Wobensmith, 2nd ABSTRACT: A valve for high-pressure fluids is provided in which multiple seating is effected by multiple engagement of seating portions of the valve plug one of which is transversely outwardly of the other with an expanding tapered or flared portion so that the operator can feel the seating and so that material displaced by one seating portion of the valve plug bucks or is in opposition to the material displaced by the other.

INVENTOR
JOHN C. BOWEN

VALVES

BACKGROUND OF THE INVENTION

1 Field of the Invention

This invention relates to valves for high pressure in which the valve plug has a plurality of seat engaging portions.

2. Description of the Prior Art

It has heretofore been proposed to provide valves for high-pressure fluids. Such valves for adequate seating requires approaching the yield point of the material.

The high-pressure material acting on the valve stem or plug exerts such a high force on the stem that it is difficult to feel when the stem or plug engages the seat. Many valves have been ruined by operators who overtighten the valve and force the stem too far into the seat.

Valves with seats arcuate in cross section with a diverging portion and a transverse portion have heretofore been proposed as in the U.S. Pat. to Hawker No. 2,144,244. In that structure the engagement of the valve plug or stem with the seat is only on the diverging portion and not on the transverse portion.

The U.S. Pat. to Small, No. 1,526,248 shows a seat similar to that of Hawker. The valve plug of Small has an insert of soft metal, soft metal composition or of vulcanized fiber so that continuous contact is effected rather than multiple contact at spaced locations, one of which is in the taper and the other of which is on a transverse surface portion. No opposing action on spaced portions of the seat can be effected with such a structure.

SUMMARY OF THE INVENTION

In accordance with the invention a valve for high-pressure fluids is provided employing a seat having an interior tapered or diverging surface portion with a valve plug having a tapered portion to engage the tapered seat portion, and an outwardly disposed portion which is tranversely outwardly of the other to engage an outward or transverse seat portion, so that the metal displaced by one seating portion is in opposed relation to the metal displaced by the other.

It is the principal object of the present invention to provide a valve for high-pressure fluids of the order of 30,000 p.s.i. or higher which will be reliable in its action and in which the operator can feel the seating of the valve plug.

It is a further object of the present invention to provide a valve of the character aforesaid which is so constructed and arranged so that overtightening and injury to the valve seat is avoided.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
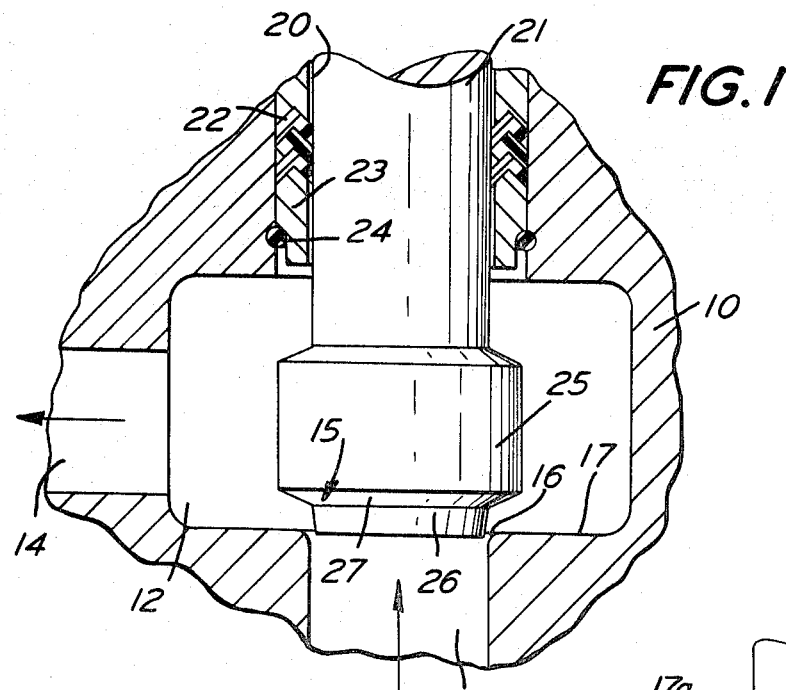
FIG. 1 is a fragmentary central sectional view of a valve in accordance with the invention in open position.
Figure 2:
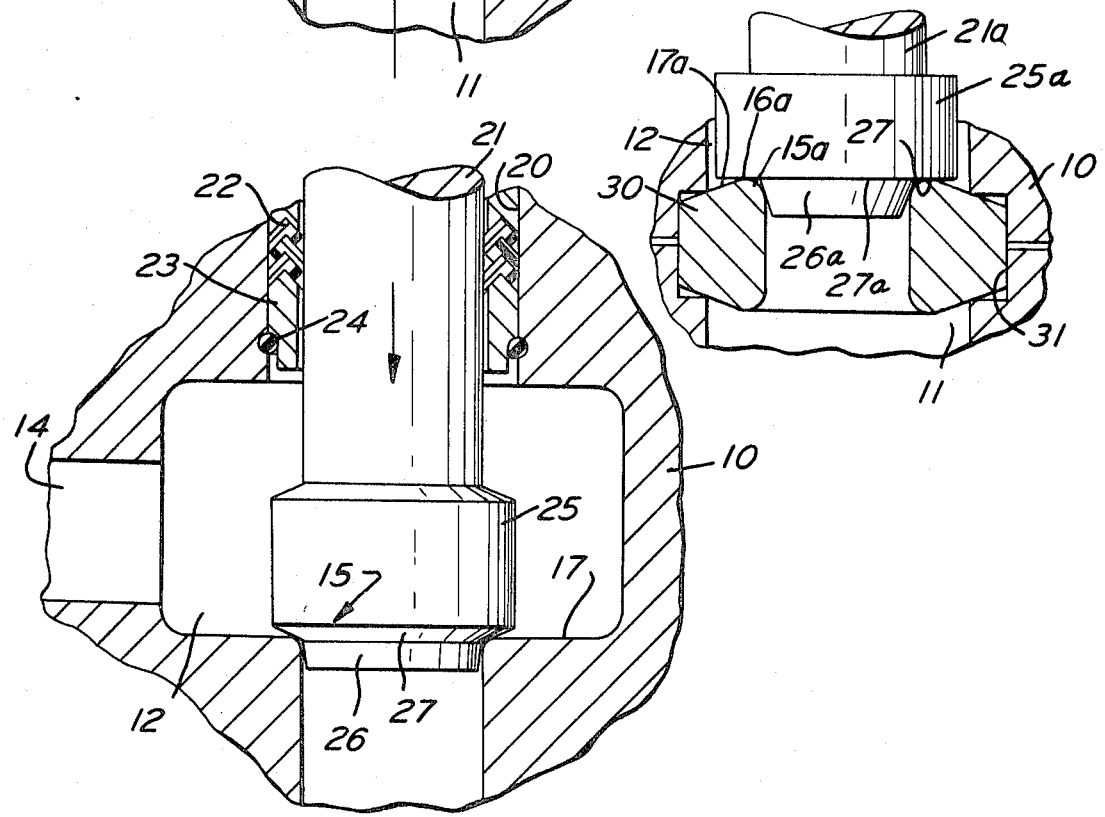
FIG. 2 is a view similar to FIG. 1 showing the valve in closed position.

Referring now more particularly to FIGS. 1 and 2 of the drawings, in the embodiment of the invention there illustrated a valve body 10 is shown having a fluid inlet passageway 11 communicating with a valve chamber 12. A fluid outlet or delivery passageway 14 is also in communication with the valve chamber 12 at one side thereof.

At the intersection of the inlet passageway 11 and the chamber 12 a valve seat 15 is provided which is preferably arcuate in cross section to provide an expanding tapered or flaring surface 16 which merges into a transverse surface 17.

The valve body 10 has a bore 20 aligned with the passageway 11 for the reception of a valve stem 21. A suitable packing 22 such as packing retainer ring 23 and O-ring 24 can be provided to prevent fluid leakage along the stem 21.

The stem 21 has a valve plug 25 carried thereon in the valve chamber 12. The plug 25 has a first seating portion 26 which is tapered or frustoconical and of a size to engage the surface 16 in metal displacing relation thereto at a location spaced longitudinally from the surface 17. The plug 25, extending from the seating portion 26, has a more transversely outwardly disposed second seating portion 27 which may also be frustoconical to engage the valve seat 15 in metal displacing relation thereto at a spaced location from that at which the seating portion 26 engages and closer to the chamber 12.

Figure 3:
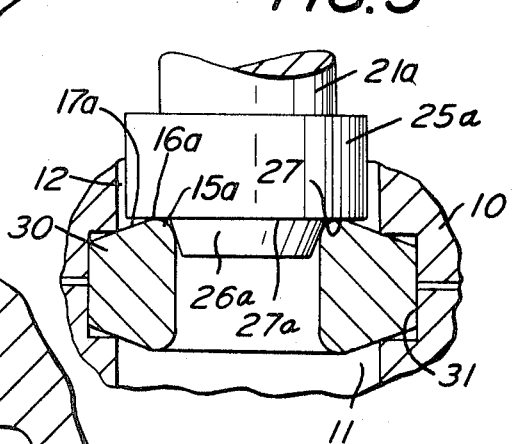
FIG. 3 is a fragmentary view showing a modified form of the invention utilizing a cone ring seat.

Referring now to FIG. 3 in the embodiment of the invention there illustrated the valve body 10 has a cone ring seat 30 carried in groove 31 at the junction of the inlet passageway 11 and the chamber 12.

The cone ring seat 30 has a valve seat 15a which is preferably arcuate in cross section to provide an expanding tapered or flaring surface 16a which merges into a surface 17a.

A valve stem 21a has a valve plug 25a with a first seating portion 26a which is tapered or frustoconical and of a size to engage the surface 16a in metal displacing relation thereto at a location spaced from the uppermost part of the cone ring valve seat 30.

The valve plug 25a, extending from the seating portion 26a, has a more transversely outwardly disposed second seating portion 27a which may extend transversely to engage the valve seat 15a in metal displacing relation at a spaced location from that at which the seating portion 26a engages and closer to the chamber 12.

The mode of operation will now be pointed out.

Upon movement of the valve stem 21 in any desired manner to bring the valve plug 25 or 25a to a seating position the first seating portion 26 or 26a will be brought into engagement with the surface 16 or 16a, in metal displacing relation thereto, and which may be close to the yield point of the metal of the seat 15 or 15a.

Upon further movement of the valve stem 21, and of the plug 25 or 25a in the same direction the second seating portion 27 or 27a will be brought into engagement with the surface 16 or 17a in metal displacing relation thereto and in opposition to the initial metal displacement.

It will thus be seen that structure has been provided for attaining the objects of the invention.

I claim:

1. A valve comprising
   a valve body having an inlet passageway and a valve chamber with which said passageway is in communication,
   said valve body having an outlet passageway communicating with said valve chamber,
   said valve chamber having a metallic valve seat with an interior surface having an outwardly flaring surface extending therefrom,
   a valve plug for movement towards and away from said seat,
   said valve plug having a first frustoconical seating surface portion for engagement with said seat at a location spaced from said chamber and
   said valve plug having a second outwardly extending seating surface portion for engagement with said seat at a spaced location closer to the chamber than the location engaged by said first seating portion,
   both said seating surface portions being engageable in opposed metal displacing relation to said seat.

2. A valve as defined in claim 1 in which said valve seat is carried on a cone ring seat member.
3. A valve as defined in claim 1 in which said second seating surface portion is frustoconical.
4. A valve as defined in claim 1 in which said second seating surface portion is transversely outwardly of said first seating portion.
5. A valve as defined in claim 1 in which said second seating surface portion is transversely disposed and outwardly of said first portion.

* * * * *